(12) United States Patent
Horikx et al.

(10) Patent No.: US 10,690,483 B2
(45) Date of Patent: Jun. 23, 2020

(54) METHODS AND SYSTEMS FOR CORRECTING FOR NONLINEAR TWIST RESPONSE IN OPTICAL SHAPE SENSING WITH SPUN MULTICORE FIBERS

(71) Applicant: KONINKLIJKE PHILIPS N.V., Eindhoven (NL)

(72) Inventors: Jeroen Jan Lambertus Horikx, Weert (NL); Gert Wim 'T Hooft, Eindhoven (NL); Anna Hendrika Van Dusschoten, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1 day.

(21) Appl. No.: 16/073,423

(22) PCT Filed: Feb. 24, 2017

(86) PCT No.: PCT/EP2017/054339
§ 371 (c)(1),
(2) Date: Jul. 27, 2018

(87) PCT Pub. No.: WO2017/144667
PCT Pub. Date: Aug. 31, 2017

(65) Prior Publication Data
US 2019/0033062 A1    Jan. 31, 2019

(30) Foreign Application Priority Data

Feb. 24, 2016  (EP) .................................... 16157054

(51) Int. Cl.
*G01B 11/16*      (2006.01)
*G01M 11/00*      (2006.01)
*G02B 6/02*       (2006.01)

(52) U.S. Cl.
CPC ....... *G01B 11/161* (2013.01); *G01M 11/3172* (2013.01); *G02B 6/02042* (2013.01)

(58) Field of Classification Search
None
See application file for complete search history.

(56) References Cited

U.S. PATENT DOCUMENTS

| 8,773,650 B2 | 7/2014 | Froggatt et al. |
| 10,422,631 B2 * | 9/2019 | Reaves .............. G01D 5/35361 |

(Continued)

OTHER PUBLICATIONS

Askins, C.G. et al., "Bend and Twist Sensing in a Multiple-Core Optical Fiber", Optical Fiber Communication/National Fiber Optic Engineers Conference, 2008, (Feb. 24, 2008), pp. 1-3.

*Primary Examiner* — Shawn Decenzo

(57) ABSTRACT

The present invention relates to a method and system of obtaining a twist rate of a twist applied to an optical fiber (12) about a longitudinal axis of the optical fiber (12) at least in a part along a length of the optical fiber, the optical fiber (12) having a center core (16) extending along the length of the optical fiber (12) and at least one outer core (14, 18, 20) helically wound around the center core (16) with a spin rate. The method comprises acquiring a twist rate phase signal from an optical measurement of strain along the center core (16) and the at least one outer core (14, 18, 20) of the optical fiber (12), calculating from the twist rate phase signal a noise filtered version of the twist rate phase signal, calculating from the twist rate phase signal a first order term of the twist rate, which is proportional to one of: i) the twist rate phase signal, ii) the noise filtered version of the twist rate phase signal, and calculating a correction term to the twist rate, which is proportional to one of the following: iii) a product of the twist rate phase signal with the noise filtered version of the twist rate phase signal, iv) a square of the noise filtered version of the twist rate phase signal.

14 Claims, 7 Drawing Sheets

(56) References Cited

U.S. PATENT DOCUMENTS

| | | | |
|---|---|---|---|
| 2011/0109898 A1* | 5/2011 | Froggatt | G01B 11/18 |
| | | | 356/73.1 |
| 2012/0069347 A1* | 3/2012 | Klein | G01B 11/161 |
| | | | 356/477 |
| 2018/0064500 A1* | 3/2018 | Froggatt | A61B 34/70 |
| 2018/0128600 A1* | 5/2018 | 'T Hooft | A61B 1/00147 |
| 2018/0195856 A1* | 7/2018 | Reaves | G01D 5/35303 |
| 2018/0231712 A1* | 8/2018 | Pare | G02B 6/02042 |
| 2019/0094459 A1* | 3/2019 | Froggatt | G02B 6/02042 |
| 2019/0234726 A1* | 8/2019 | Gifford | G01B 11/161 |
| 2019/0250050 A1* | 8/2019 | Sanborn | G01L 1/242 |

\* cited by examiner

METHODS AND SYSTEMS FOR CORRECTING FOR NONLINEAR TWIST RESPONSE IN OPTICAL SHAPE SENSING WITH SPUN MULTICORE FIBERS

CROSS-REFERENCE TO PRIOR APPLICATIONS

This application is the U.S. National Phase application under 35 U.S.C. § 371 of International Application Serial No. PCT/EP2017/054339, filed on Feb. 24, 2017, which claims the benefit of European Patent Application No. 16157054.4, filed on Feb. 24, 2016. This application is hereby incorporated by reference herein.

FIELD OF THE INVENTION

The present invention generally relates to the field of optical shape sensing using a spun multicore optical fiber. In particular, the present invention relates to a method of and a system for obtaining a twist rate of a twist applied to an optical fiber about a longitudinal axis of the optical fiber at least in a part along a length of the optical fiber, the optical fiber having a center core extending along the length of the optical fiber and at least one outer core helically wound around the center core with a spin rate.

BACKGROUND OF THE INVENTION

Optical shape sensing (OSS), also referred to as Fiber-Optic RealShape (FORS), is a useful technology to reconstruct a three-dimensional shape of a device, in particular elongated device. In case of medical appliances, such a device may be an interventional device, e.g. a catheter or guide wire, which is partially inserted into a patient's body and thus cannot be directly viewed with the user's eyes. With optical shape sensing using an optical shape sensing fiber integrated in the interventional device, the three-dimensional shape of the interventional device can be known and thus be made "visible" up to the tip of the device.

US 2012/0069347 A1 and U.S. Pat. No. 8,773,650 B2 provide an overview of optical shape sensing. The whole content of these documents is incorporated herein by reference.

In optical shape sensing, the cores of a spun multicore optical fiber are interrogated simultaneously by an interferometric distributed-sensing system that makes use of, e.g., Optical Frequency Domain Reflectometry (OFDR).

In OFDR, light from a tunable light source, e.g. laser source, is coupled into an optical fiber, and the reflected or backscattered light is made to interfere with light from the same light source that has traveled along a reference path. When the frequency of the light source is swept linearly in time, the interference between the light that is coming from a single fixed scattering point on the optical fiber and the reference light creates a detector signal that has a constant frequency, this frequency being proportional to the difference of the travel time of the light along the measurement path along the optical fiber and the reference path. As the propagation velocity of the light and the length of the reference path are known, the position of the scattering point can be computed from the observed frequency.

When multiple scatters are present in the optical measurement fiber, the detector signal will be a superposition of different frequencies, each frequency indicative of the position of the respective scatterer. A Fourier transform of the detector signal (a "scattering profile") can be computed; in graphs of the amplitude and phase of the transform signal, the amplitude and phase of the different frequencies that are present in the detector signal (which corresponds to different scatterer positions) will be shown at their respective positions along the horizontal axis of the graph.

The amplitude and phase of the scattered light can be affected by external influences acting on the fiber. For example, when the fiber is deformed by external stresses, for example by bending the optical fiber, or when the temperature of the optical fiber is modified, effects will be seen on the phase and/or amplitude of the scattering profile. From a comparison of the scattering profile of the optical fiber in a deformed state to the scattering profile of the same optical fiber in an unstressed reference state, information can be obtained about the external influences on the fiber as a function of position along the optical fiber, i.e. the optical fiber can be used for distributed sensing.

An optical fiber used in optical shape sensing usually is a spun multicore fiber comprising a center core and one or more outer cores helically wound around the center core. External stresses lead to strain of the cores which in turn leads to optical path length changes of each core of the multicore fiber. The system for optical shape sensing is capable of detecting the optical path length changes of each core simultaneously over a range of positions along the fiber, through comparison of the scattering profiles of each core of a strained "shape" measurement and an unstrained "reference" measurement.

When a fiber is bent, a core on the outside of the bend experiences positive strain (elongation), while a core on the inside of the bend experiences negative strain (compression). With sufficient knowledge of the distances of the cores to the center of the optical fiber and of the angles between the cores as seen from the center of the fiber, the radius of curvature and the orientation (angular position) relative to the cores of the center of the local tangent circle can be determined from the magnitudes of the strain signals of the cores. The "local tangent circle" is also known as the "osculating circle" in the branch of mathematics dealing with the differential geometry of curves.

In order to reconstruct the shape of an optical fiber, it is necessary to know the radius of curvature and the (change of) orientation of the local tangent circle in space. From the strain signals obtained by the optical shape sensing measurement it is possible to obtain the radius of curvature and the (change of) orientation of the local tangent circle relative to the cores. Thus, for proper shape reconstruction a method of obtaining information about the orientation of the cores in the deformed optical fiber is required. This in turn requires knowledge of the orientation of the cores in the reference (unstrained) state, in addition to a method for obtaining the change of orientation of the cores in a shape (deformed state of the fiber) relative to the reference state of the fiber (not deformed state). In other words, to translate strain signals provided by the optical shape sensing measurement from the outer cores into bend and bend direction, the rotational position of an outer core must be determined with a high degree of accuracy.

If a method of determining the change of orientation of the cores in a shape relative to the reference is available, the orientation of the cores in the reference can be obtained by measuring a special shape, e.g. a flat spiral: a shape which has curvature everywhere and the centers of the tangent circles all lie in the same plane. From the bend signals the orientation of the tangent circles of the shape relative to the cores can be computed. As the orientation of the tangent circles of the flat spiral is fixed in space, the orientation of the cores in the flat spiral shape is thus known. As it was assumed that a method for determining the change of orientation of the cores in the flat spiral relative to the reference is available, the orientation of the cores in the reference can now be computed.

In the current state of the art, the method for determining the change of orientation of the cores in a shape relative to the reference makes use of a twist rate phase signal that is a linear combination of the strain signals of the individual cores of the multicore fiber. For a multicore fiber with ideal geometry (a central core in the exact center of the fiber, and outer cores all at the same distance from the center of the fiber, and spaced equidistant in angular position), the twist rate phase signal equals the average of the outer core strain signals minus the strain signal of the central core. This twist rate phase signal is by design not sensitive to axial strain (common to all cores) and temperature changes.

For non-ideal fiber geometry, a method is described in US 2012/0069347 A1 for generating a twist rate phase signal that is a linear combination with modified coefficients of the strain signals, such that the resulting twist rate phase signal is still not sensitive to axial strain and temperature changes.

When the fiber is twisted in a manner that increases the number of turns per unit length, the outer cores become longer while the length of the central core remains constant, giving rise to a non-zero twist rate phase signal. When the fiber is twisted in a manner that decreases the number of turns per unit length, the outer cores become shorter, giving rise to a twist rate phase signal of opposite sign.

To lowest order, the twist rate phase signal is proportional to the change in number of turns per unit length of the fiber, i.e. to the rate of change of the true twist angle. It is known, however, that the relationship between twist rate phase signal and the rate of change of the true twist angle is intrinsically nonlinear. For large twist rate changes, a second-order (i.e. quadratic) term in the relation between change of twist rate and the resulting change of core length needs to be considered, as indicated in U.S. Pat. No. 8,773,650 B2.

However, U.S. Pat. No. 8,773,650 B2 does not disclose how to calculate the second-order term in order to compensate for the nonlinearity of the dependency of the twist rate on the twist rate phase signal.

To obtain the true twist angle at a chosen point on the optical fiber—i.e. the change of orientation of the cores between shape and reference at the chosen point, as compared to their relative orientation at a starting point—the rate of change of the true twist angle will have to be integrated along the fiber from the starting point up to the chosen point. This integration which is necessary in order to obtain the true twist angle at a chosen point reveals in practice that simply considering a second-order term in the relation between the twist rate phase signal and the true twist rate does not lead to an accurate twist angle at a chosen point along the optical fiber.

Thus, there is still a need in an improved method and system for obtaining a twist rate from the measured twist rate phase signal in order to arrive at accurate twist angles after integration.

SUMMARY OF THE INVENTION

It is an object of the present invention to provide a method and a system for accurately correcting the nonlinearity of the relation between twist rate phase signal and twist rate of twist applied to an optical fiber.

It is another object of the invention to provide a method and a system for accurately correcting the nonlinearity of the relation between twist rate phase signal and twist rate of twist applied to an optical fiber such that integration of the twist rate results in an accurate twist angle at a chosen point on the optical fiber relative to a starting point.

In a first aspect of the present invention, a method of obtaining a twist rate of a twist applied to an optical fiber about a longitudinal axis of the optical fiber at least in a part along a length of the optical fiber is provided, the optical fiber having a center core extending along the length of the optical fiber and at least one outer core helically wound around the center core with a spin rate, the method comprising:

acquiring a twist rate phase signal from an optical measurement of strain along the center core and the at least one outer core of the optical fiber, calculating from the twist rate phase signal a noise filtered version of the twist rate phase signal, calculating from the twist rate phase signal a first order term of the twist rate, which is proportional to one of: i) the twist rate phase signal, ii) the noise filtered version of the twist rate phase signal, and calculating a correction term to the twist rate, which is proportional to one of the following:

iii) a product of the twist rate phase signal with the noise filtered version of the twist rate phase signal, iv) a square of the noise filtered version of the twist rate phase signal.

With the method according to the invention, a twist rate of a twist applied to an optical fiber can be obtained from the measured twist rate phase signal with high accuracy. The method provides to calculate a correction term to the twist rate which compensates for the nonlinearity of the relation between twist rate phase signal and twist rate. The correction term is a second-order (quadratic) term. However, the quadratic term does not simply make use of the square of the measured twist rate phase signal, but also makes use of a noise filtered version of the twist rate phase signal. The reason for this is that the measured twist rate phase signal is inevitably contaminated by noise, and may also be contaminated by crosstalk from bend signals as a result of non-perfect correction for deviations of the core positions from perfect geometry. If the square of the measured twist rate phase signal was used in the correction term without further processing, the effect of the afore-mentioned contaminations would no longer average out to zero, as the quadratic term is always positive. In the method according to the present invention, the effect of noise and crosstalk contaminations is eliminated by calculating from the twist rate phase signal a noise filtered version of the twist rate phase signal in which noise and/or crosstalk are at least reduced or even eliminated. After integration of the twist rate obtained by the method of the present invention, a twist angle at a chosen point on the optical fiber can be obtained with high accuracy. Thus, the method according to the invention can be used in accurate 3D shape reconstruction with OSS systems.

Preferred embodiments of the invention are defined in the dependent claims.

The optical fiber may have a plurality of outer cores, in particular three outer cores helically wound around the center core.

In preferred embodiments, calculating the correction term further comprises multiplying the product according to iii) or the square according to iv) with a numerical factor which is larger than 1 and smaller than 3.

This measure further increases the accuracy of obtaining the twist rate from the measured twist rate phase signal. Since the use of a second-order term as a correction of the twist rate still is an approximation for the correction of the nonlinearity between the twist rate and the twist rate phase signal, multiplying the correction term with the numerical factor larger than 1 and smaller than 3 advantageously increases the accuracy of the calculated twist rate. Using a multiplication factor for refining the second-order correction term increases accuracy without increasing computing expenditure or calculation time for calculating the correction term.

In preferred embodiments, the numerical factor may be larger than 1.1 and smaller than 2.5, and in further preferred embodiments, the numerical factor is in a range from about 1.3 to about 1.7.

In a further preferred embodiment, the correction term is inversely proportional to the spin rate of the at least one outer core.

The spin rate of the at least one outer core equals the number of periods of the helical windings of the at least one outer core per unit length times $2\pi$. The spin rate is a constant quantity along the optical fiber and determined by the design of the optical fiber, i.e. set in the manufacturing process of the optical fiber.

In further embodiments, the first-order term of the twist rate is calculated as one of $$\tau_0 = TG \cdot S_\tau \quad \text{i)}$$

$$\tau_f = TG \cdot \langle S_\tau \rangle \quad \text{ii)}$$

wherein TG is a twist gain calibration parameter, $S_\tau$ is the acquired twist rate phase signal, and $\langle S_\tau \rangle$ is the noise filtered version of the acquired twist rate phase signal.

In further preferred embodiment, the correction term of the twist rate is calculated as one of $$F \cdot \tau_0 \cdot \tau_f / 2k \quad \text{i)}$$

$$F \cdot \tau_f^2 / 2k \quad \text{ii)}$$

wherein k is the spin rate of the at least one outer core, $\tau_0$ is the first order term of the twist rate calculated based on the twist rate phase signal, and $\tau_f$ is the first order term of the twist rate calculated based on the noise filtered version of the twist rate phase signal, and F is a numerical factor larger than 1 and smaller than 3.

In further preferred embodiments, the twist rate $\tau$ is calculated as one of the following:

$$\tau = \tau_0 - (F \cdot \tau_0 \cdot \tau_f / 2k) \quad \text{i)}$$

$$\tau = \tau_0 - (F \cdot \tau_f^2 / 2k) \quad \text{ii)}$$

In further preferred embodiments, the twist rate phase signal is acquired from a strain signal of the at least one outer core minus a strain signal of the center core.

A twist rate phase signal acquired in this way is not sensitive to axial strain and temperature changes which are common to all cores and thus eliminated from the twist rate phase signal.

In further preferred embodiments, the method according to the invention further comprises integrating the twist rate along the length of the optical fiber from a starting position to a selected position to obtain a twist angle at the selected position relative to the starting position.

As mentioned above and described herein, the method according to the invention renders it possible to obtain a true twist angle at a chosen position along the fiber relative to a starting position with high accuracy after integration of the twist rate.

According to a second aspect of the invention, a system is provided for obtaining a twist rate of a twist applied to an optical fiber about a longitudinal axis of the optical fiber at least in a part along a length of the optical fiber, the optical fiber having a center core extending along the length of the optical fiber and at least one outer core helically wound around the center core with a spin rate, the system comprising an optical measuring device configured to measure strain along the center core and the at least one outer core of the optical fiber to acquire a twist rate phase signal, a calculating unit configured to:

calculate from the twist rate phase signal a noise filtered version of the twist rate phase signal, calculate a first order term of the twist rate, which is proportional to one of: i) the twist rate phase signal, ii) the noise filtered version of the twist rate phase signal, and calculate a correction term of the twist rate, which is proportional to one of the following:

iii) a product of the twist rate phase signal with the noise filtered version of the twist rate phase signal, iv) a square of the noise filtered version of the twist rate phase signal.

The system according to the invention has similar and/or identical advantages as the method according to the invention, and it is to be understood that the system according to the invention has similar and/or identical preferred embodiments as the method according to the invention as defined in the dependent claims of the method.

In preferred embodiments, the optical measuring device used for measuring strain in the optical fiber is an optical shape sensing device based on optical frequency domain reflectometry.

In a third aspect of the invention, an optical shape sensing system is provided, comprising a system according to the second aspect of the invention for obtaining a twist rate of a twist applied to an optical fiber about a longitudinal axis of the optical fiber at least in a part along a length of the optical fiber, the optical fiber having a center core extending along the length of the optical fiber and at least one outer core helically wound around the center core with a spin rate.

According to a fourth aspect of the invention, a computer program comprising program code means for causing a computer to carry out the steps of the method according to the first aspect is provided, when said computer program is carried out on a computer.

BRIEF DESCRIPTION OF THE DRAWINGS

These and other aspects of the invention will be apparent from and elucidated with reference to the embodiments described hereinafter. In the following drawings

DETAILED DESCRIPTION OF THE INVENTION

In the following, embodiments of a method and a system are described with which a twist rate of a twist applied to an optical fiber about a longitudinal axis of the optical fiber at least in a part along a length of the optical fiber can be obtained with high accuracy. Calculating the twist rate as accurately as possible is advantageous in shape reconstruction of the optical fiber in three dimensions. Shape reconstruction using an optical fiber may be performed by an optical shape sensing system, an embodiment of which will be first described with reference to FIG. 1.

Figure 1:
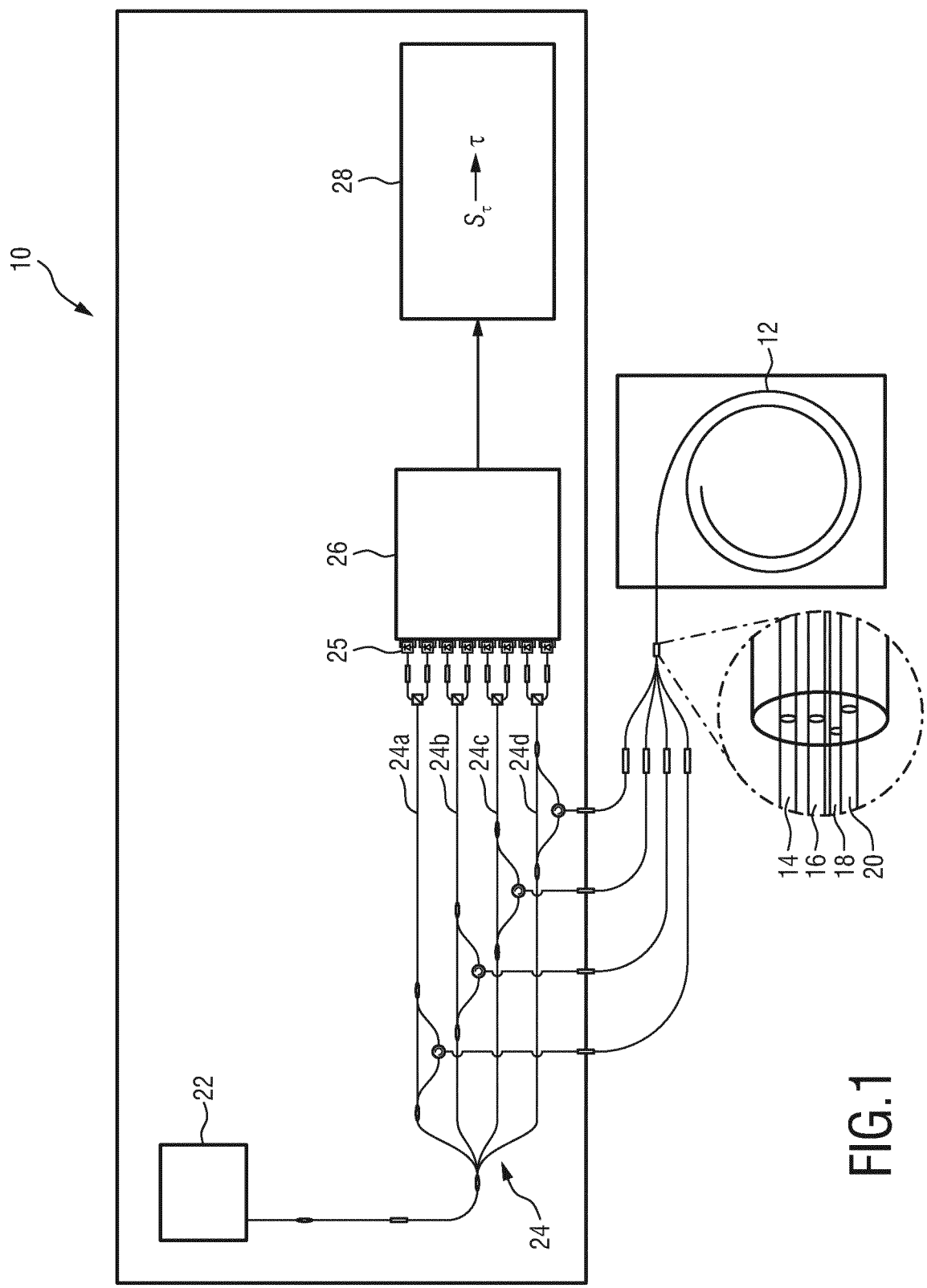
FIG. 1 shows an embodiment of parts of an optical shape sensing system for use in the present invention.

FIG. 1 shows parts of an optical shape sensing system configured as a multi-channel OFDR-based distributed-strain-sensing system for sensing a multicore optical fiber 12. The multicore fiber has a plurality of cores, 14, 16, 18, 20, in the example shown the optical fiber 12 comprises four cores with one center core and three outer cores.

Figure 2:
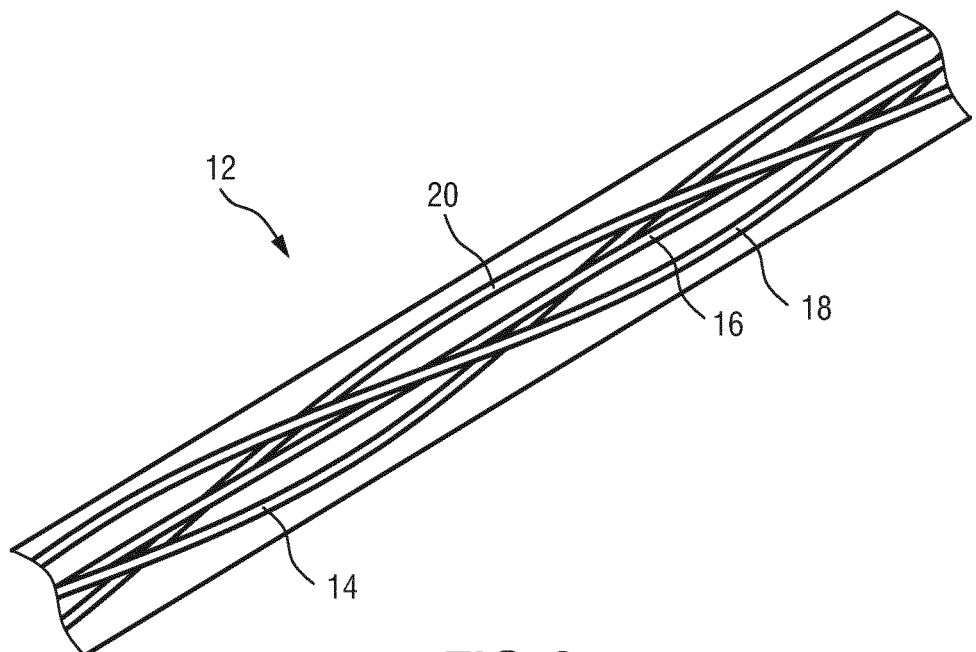
FIG. 2 shows a piece of length of a spun optical fiber for use in the present invention.

As shown in FIG. 2, the outer cores 14, 18, 20 are helically wound around the center core 16.

With reference again to FIG. 1, the optical shape sensing system 10 comprises a tunable light source 22 which can be swept through a range of optical frequencies. The light emitted by the light source 22 is coupled into an interferometric interrogator 24 having four channels 24a, 24b, 24c, 24d, wherein each of the cores 14, 16, 18, 20 is assigned one of the channels 24a, 24b, 24c, 24d. When the tunable light source 22 is swept through a range of optical frequencies, each channel 24a, 24b, 24c, 24d is simultaneously measured, and the resulting interference pattern from each channel 24a, 24b, 24c, 24d is routed to data acquisition electronics 26 having a plurality of respective photo detectors 25. Each channel 24a, 24b, 24c, 24d is processed independently and identically. The distributed strain measurements recorded using the multiple-channel OFDR system from the cores 14, 16, 18, 20 may then be exported for use for further processing, as indicated by a processing or calculation unit 28.

The system 10 is capable of generating strain signals measured on the cores 14, 16, 18, 20, and to generate from the strain signals twist rate phase signals $S_\tau$, as described in U.S. Pat. No. 8,773,650 B2 the whole content of which is incorporated herein by reference. In the following, the nature of the twist rate phase signal will be described.

Light from the tunable light source 22 is coupled into each of the cores of the measurement optical fiber 12, and the reflected or backscattered light is made to interfere with light from the light source 22 that has traveled along a respective reference path in the channels 24a, 24b, 24c, 24d of the interrogator 24. When the frequency of the light source 22 is swept linearly in time, the interference between the light that is coming from a single fixed scattering point on a core of the optical fiber 12 and the reference light creates a detector signal in the respective detector 25 that has a constant frequency, this frequency being proportional to the difference of the traveled time of the light along the measurement path and the reference path. As the propagation velocity of the light and the length of the reference path are known, the position of the scattering point can be computed from the observed frequency.

Since multiple scatterers are present in the measurement fiber 12 along each of the cores 14, 16, 18, 20, the detector signal will be a superposition of different frequencies, each frequency indicative of the position of the respective scatterer along the respective core. The Fourier transform of the detector signal (a "scattering profile") can be computed. In graphs of the amplitude and phase of the transformed signal, the amplitude and phase of the different frequencies that are present in the detector signal (which correspond to different scatterer positions) will be shown at their respective positions along the horizontal axis of the graph.

The amplitude and phase of the scattered light can be affected by external influences acting on the fiber 12. For example, when the fiber is deformed by external stresses (e.g. as shown for the fiber 12 in FIG. 1, which is exemplarily shown as bend to a spiral), or when the temperature of the fiber is modified, effects will be seen on the phase and/or amplitude of the scattering profile. From the comparison of the scattering profile of the fiber to the scattering profile of the same fiber in a reference state, information can be obtained about the external influences on the fiber 12 as a function of position along the fiber 12, i.e. the fiber 12 can be used for distributed sensing.

The system 10 for optical shape sensing is capable of detecting optical path length changes of each core 14, 16, 18, 20 of the spun multicore fiber 12 simultaneously over a range of positions along the fiber 12, through comparison of the scattering profiles of each core 14, 16, 18, 20 of a "shape" measurement and an unstrained "reference" measurement.

Considering two arbitrary points located in the sensing region of the fiber 12, a change of optical path lengths between these two points for a chosen core of the cores 14, 16, 18 or 20 when a shape measurement and an unstrained reference measurement are compared manifests itself as a change of the phase difference between these two points in the scattering profiles of the shape and the reference of this core. If these points are chosen to be close to each other, the change of optical path lengths will be proportional to the strain of the core in the vicinity of these points, while the change of phase difference is proportional to the derivative of the phase difference between the scattering profiles of shape and reference. It follows that the local strain signal of a core is proportional to the derivative of the difference in phase of the scattering profiles of the core between the strained state and an unstrained reference state of that core.

The twist rate phase signal is a linear combination of the strain signals (i.e. the derivatives of the phase differences with the reference) of the individual cores 14, 16, 18, 20 of the optical fiber 12. For a multicore fiber with ideal geometry (the central core 16 in the exact center of the fiber 12, and the outer cores 14, 18, 20 all at the same distance from the center of the fiber 12, and spaced equidistant in angular position) the twist rate phase signal equals the average of the strain signals of the outer cores 14, 18, 20 minus the strain signal of the central core 16. This twist rate phase signal is by design not sensitive to axial strain and temperature changes (which are common to all cores).

For non-ideal fiber geometry, a method is described in US 2012/0069347 A1 for generating a twist rate phase signal that is a linear combination with modified coefficients of the strain signals, such that the resulting twist rate phase signal is still not sensitive to axial strain and temperature changes. The afore-mentioned document is incorporated herein by reference.

It is to be noted that when a fiber is bent, a second-order stress effect creates a small difference between the refractive index of the central core and the average of the refractive indices of the outer cores, giving rise to a false twist rate phase signal. This false twist rate phase signal can be compensated, as indicated in U.S. Pat. No. 8,773,650 B2 (equation 30 there). In the remainder of the present disclosure, it will be assumed that the twist rate phase signals dealt with here have already been compensated for this bend-induced false twist signal.

When the fiber 12 is twisted in a manner that increases the number of turns per unit length, the outer cores 14, 18, 20 become longer while the length of the central core 16 remains constant, giving rise to a non-zero twist rate phase signal. When the fiber 12 is twisted in a manner that decreases the number of turns per unit length, the outer cores become shorter, giving rise to a twist rate phase signal of opposite sign.

To lowest order, the twist rate phase signal is proportional to the change in number of turns per unit length of the optical fiber 12, i.e. to the rate of change of the true twist angle. However, the relationship between twist rate phase signal and the rate of change of the true twist angle is intrinsically nonlinear.

In the following, it will be described how the twist rate and thus the twist angle can be obtained from the twist rate phase signal in an accurate manner. This method can be performed by the calculating or processing unit 28 in FIG. 1. The calculation unit 28 uses the strain data measured on the optical fiber 12 for calculating the twist rate $\tau$ from the twist rate phase signal $S_\tau$.

To begin with the description, consider a fiber that, during manufacturing, has been spun in such a manner that the orientation of the outer cores repeats periodically with a period of length P. The number of periods per unit length then is N=1/P. The spin rate of the fiber, which is the change of orientation angle of the outer cores per unit length, be k. As each period corresponds to rotation over an angle of $2\pi$ radiants, the spin rate k can be written as:

$$k = 2\pi N = 2\pi/P \quad (1)$$

By applying torque to the optical fiber, the spun fiber is caused to twist. Suppose enough torque is applied to increase the number of turns per unit length by M. The net rate of angular change of an outer core of the fiber will then have become $$k + \tau = 2\pi(N + M) = 2\pi\left(\frac{1}{P} + \frac{1}{T}\right) \quad (2)$$

where the twist rate $\tau$ of added twist is defined as $$\tau = 2\pi M = \frac{2\pi}{T} \quad (3)$$

with T the length of one turn of added twist.

Now, consider two planes perpendicular to the fiber axis that are the distance P apart, and consider the two points where a chosen fiber core intersects the two planes. The distance of the chosen core to the center of the fiber be a. For an outer core, a will be the radius of the helix describing the shape of that core. Below, it will be shown how the length between these two points changes under applied twist.

Figure 3:
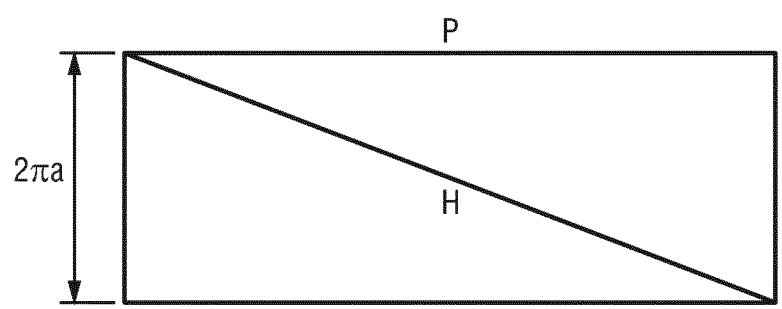
FIG. 3 shows an outer core of the optical fiber in FIG. 2 modeled as a flattened cylinder.

First consider the untwisted fiber. When imagining to roll out the helix onto a flat plane, the length H of the outer core between the two points will be seen to be the hypotenuse of a right-angled triangle with sides P and $2\pi a$ as shown in FIG. 3. The following then holds:

$$H^2 = P^2 + (2\pi a)^2, \text{ or } \frac{H}{P} = \left(1 + \left(\frac{2\pi a}{P}\right)^2\right)^{1/2} = (1 + a^2 k^2)^{1/2} \quad (4)$$

When the two planes are an arbitrary distance d apart rather than the distance P, the length $l_0$ between the two intersection points will still follow from the same ratio. When the square root in this ratio is approximated by the lowest-order term in the Taylor expansion, then $$\frac{l_0}{d} = (1 + a^2 k^2)^{1/2} \approx 1 + \frac{1}{2} a^2 k^2 \quad (5)$$

In practice, a is of the order of for example 35 µm, while P is of the order of 20 mm, so that $$a^2 k^2 \approx 1.21 \times 10^{-4} \quad (6)$$

The smallness of this number shows that neglecting higher-order terms in the approximation of the square root is justified.

When twist is added to the fiber, a length $l_\tau$ can be computed in a similar manner, resulting in $$\frac{l_\tau}{d} = \left(1 + a^2(k + \tau)^2\right)^{1/2} \approx 1 + \frac{1}{2} a^2 (k + \tau)^2 = \frac{l_0}{d} + a^2 k\tau + \frac{1}{2} a^2 \tau^2 \quad (7)$$

Thus, it can be seen that when the fiber is twisted, with twist rate $\tau$ of twist applied, the length of a core at a distance a from the fiber center changes by an amount $\delta$ that is given by $$\frac{\delta}{d} = \frac{l_\tau - l_0}{d} = a^2 k \tau + \frac{1}{2} a^2 \tau^2 \quad (8)$$

It can be observed from the foregoing that the length change contains a term linear in the added twist rate $\tau$ as well as a term quadratic in $\tau$. The ratio between the quadratic term and the linear term in the relation between length change of the outer core and added twist rate $\tau$ is given by $\tau/(2k)$, which approaches zero for small added twist rates, i.e. for small twist rates it is sufficient to consider the linear term only.

For ideal fiber geometry, the twist rate phase signal was defined as the average of the outer core strain signals minus the strain signal of the center core, where the strain signal of a core is the derivative of the difference in phase of the scattering profiles of the core between the strained state and an unstrained reference state. The twist rate phase signal is obtained from a measurement of the fiber 12. For small twist rates, the twist gain TG is a calibration parameter that relates the measured twist rate phase signal, which is called $S_\tau$ in the following, to the added twist rate $\tau$:

$$\tau = TG \cdot S_\tau \tag{9}$$

It is noted that, depending on the details of implementation of the shape sensing system like the shape sensing system 10, it may be the case that a positive added twist rate, i.e. an added twist rate that results in an increase in length of an outer core, results in a twist rate phase signal that is negative. In this case, the twist gain TG will be negative.

It could be expected that a twist rate phase signal $S_\tau$ would be proportional to the core length change derived above, and that, in order to compensate for the second-order length variation, it would be needed to subtract a second-order term equal to the linear term multiplied by the ratio $\tau/(2k)$, derived above. Thus, it is expected:

$$\tau = TG \cdot S_\tau - \frac{\tau}{2k} TG \cdot S_\tau \tag{10}$$

which can also be written as $$\tau\left(1 + \frac{TG \cdot S_\tau}{2k}\right) = TG \cdot S_\tau \text{ or } \tau = \frac{TG \cdot S_\tau}{1 + \frac{TG \cdot S_\tau}{2k}} \tag{11}$$

or $$\tau \approx TG \cdot S_\tau \left(1 - \frac{TG \cdot S_\tau}{2k}\right) = TG \cdot S_\tau - \frac{1}{2k}(TG \cdot S_\tau)^2 \tag{12}$$

Defining the first-order term or estimate of the added twist rate as $\tau_0$, the expected relation between twist rate phase signal and added twist rate can also be written as $$\tau \approx \tau_0\left(1 - \frac{\tau_0}{2k}\right) = \tau_0 - \frac{\tau_0^2}{2k} \text{ with } \tau_0 = TG \cdot S_\tau \tag{13}$$

The above equation would allow computing the twist rate $\tau$ from the measured twist rate phase signal $S_\tau$, using the calibrated twist gain TG combined with the known spin rate k of the fiber 12.

This equation should correct for the nonlinearity in the relation between added twist and measured twist signal in an accurate manner. However, it turns out that straightforward application of this equation does not result in accurate twist angles after integration. The reason this equation fails to deliver an accurate result after integration is twofold.

Firstly, the signal $S_\tau$ is inevitably contaminated by noise, and may also be contaminated by crosstalk from bend signals as a result of non-perfect correction for deviations of the core positions from perfect geometry. In the quadratic correction term, the effect of these contaminations no longer averages out to zero, as the term is always positive.

Secondly, the nonlinearity in the relation between added twist rate and measured twist rate phase signal is in fact larger than as expected by the second-order correction term derived above.

A solution for the first problem caused by noise and crosstalk can be found in some embodiments according to which the twist rate phase signal in the second-order correction term should be treated differently from the twist rate phase signal in the first order linear term of the twist rate. In fact, by a proper filtering the twist rate phase signal, the effect of noise and bend-to-twist crosstalk on the correction term can be lowered considerably.

A solution to the second problem according to which the nonlinearity in the relation between added twist rate and measured twist rate phase signal is larger than suggested by the correction term derived above can be found in some embodiments by multiplying a multiplication factor to the correction term derived above. In some embodiments, this numerical factor is larger than 1 and smaller than 3. In further embodiments, the numerical factor is larger than 1.1 and smaller than 2.5. In further embodiments, the numerical factor is in a range from about 1.3 to about 1.7.

Figure 4:
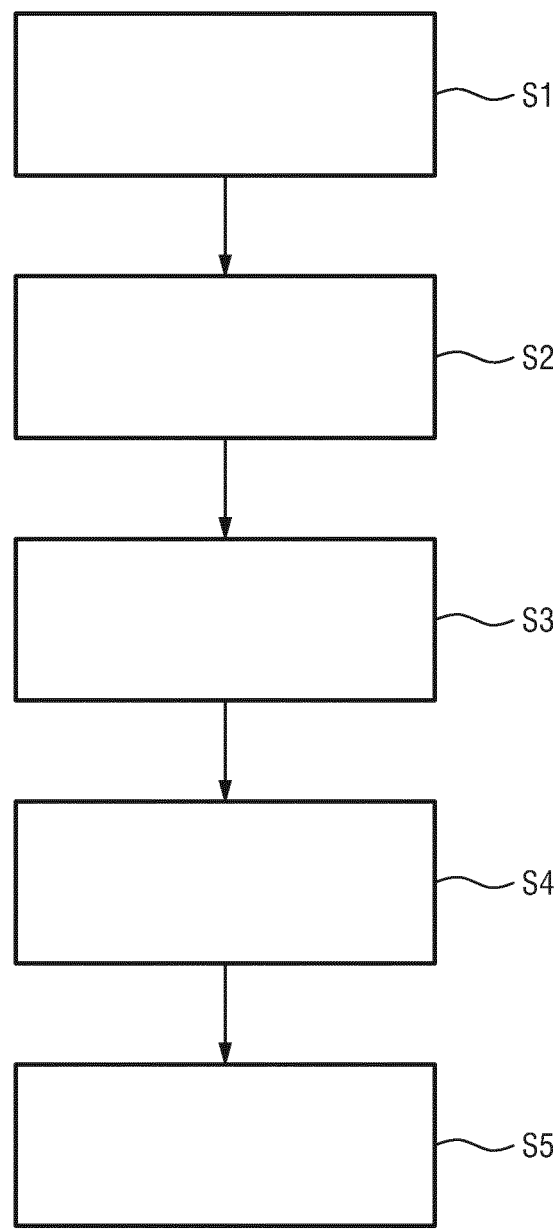
FIG. 4 shows a flow chart of a method of obtaining a twist rate of a twist applied to an optical fiber.

With reference to FIG. 4, an embodiment of a method of obtaining a twist rate of a twist applied to an optical fiber like the optical fiber 12 in FIG. 1 about a longitudinal axis of the optical fiber at least in a part along a length of the optical fiber will be described, the optical fiber having a center core like the center core 16 in FIG. 2 extending along the length of the optical fiber and at least one outer core like one of the cores 14, 18, 20 in FIG. 2 helically wound around the center core with the spin rate.

The method can be performed with the system 10 in FIG. 1. Further, the optical fiber may have two, three or more outer cores helically wound around the center core.

In step S1, a twist rate phase signal $S_\tau$ is acquired from an optical measurement of strain along the center core and the at least one outer core of the optical fiber.

In step S2, a noise filtered version $<S_\tau>$ of the twist rate phase signal is calculated from the twist rate phase signal $S_\tau$ measured in step S1.

In step S3, a first-order term $\tau_0$ or $\tau_f$ of the twist rate $\tau$ is calculated from the twist rate phase signal $S_\tau$, wherein the first-order term $\tau_0$ is proportional to the twist rate phase signal $S_\tau$ as measured in step S1, or the first-order term $\tau_f$ is proportional to the noise filtered version $<S_\tau>$ of the twist rate phase signal as calculated in step S2.

In step S4, a correction term $\tau_{corr}$ to the twist rate is further calculated, wherein the correction term $\tau_{corr}$ is proportional to a product of the twist rate phase signal $S_\tau$ as measured in step S1 with the noise filtered version $<S_\tau>$ of the twist rate phase signal as calculated in step S2, or the correction term $\tau_{corr}$ is proportional to a square of the noise filtered version $<S_\tau>$ of the twist rate phase signal as calculated in step S2.

In step S5, the twist rate $\tau$ as obtained as a linear combination of the first-order term and the second-order term is integrated along the length of the optical fiber from a starting position to a selected position to obtain the twist angle at the selected position relative to the starting position.

Thus, in some embodiments, it is proposed to compute a strongly filtered version $<S_\tau>$ of the twist rate phase signal and to use this filtered version to compute the second-order correction term $\tau_{corr}$ that is modified in strength, while the first-order term $\tau_0$ can be computed in the usual manner, for example as known from the state of the art.

Defining the unfiltered first-order term of the twist rate as $\tau_0$, and the filtered version of the first-order term of the twist rate as $\tau_f$, wherein $$\tau_0 = TG \cdot S_\tau, \tau_f = TG \cdot <S_\tau> \tag{14}$$

the twist rate $\tau$ can be calculated according to one of the following equations:

$$\tau = \tau_0\left(1 - f\frac{\tau_f}{2k}\right) = \tau_0 - F\frac{\tau_0 \tau_f}{2k} \tag{15}$$

or $$\tau = \tau_0 - F\frac{\tau_f^2}{2k} \tag{16}$$

F is the numerical factor as mentioned above. The factor F is larger than 1.1 and preferably in the range between 1.3 and 1.7.

In the first above alternative (equation 15), the correction term is proportional to the product of the filtered and the unfiltered first-order term of the twist rate, while in the second alternative (equation 16) the correction term is proportional to the square of the filtered first-order term of the twist rate.

Figure 5:
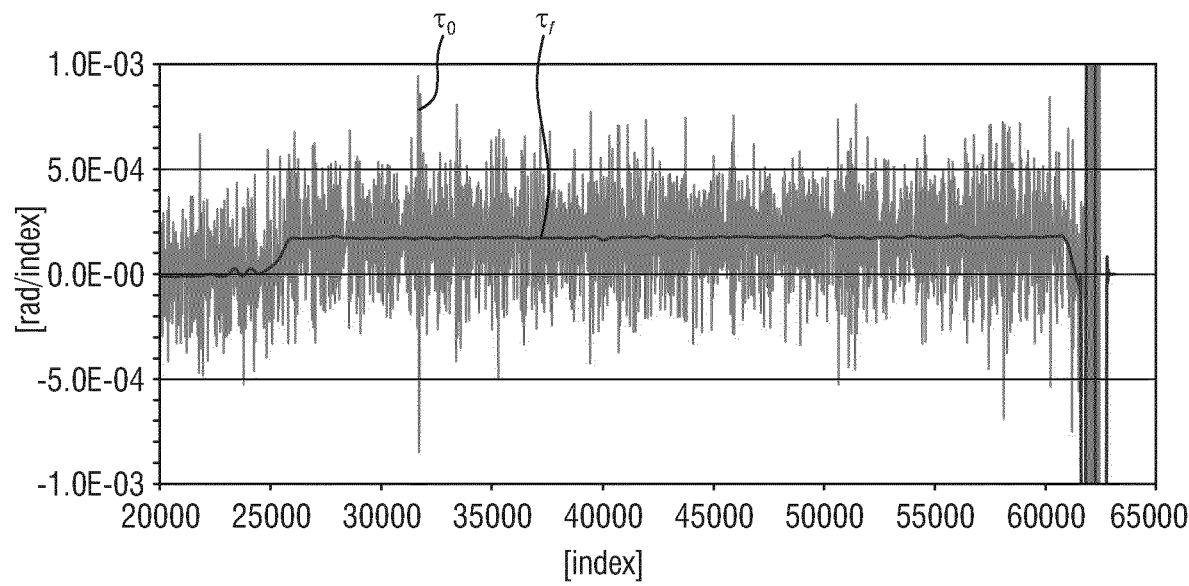
FIG. 5 shows two graphs of an unfiltered twist rate estimate and a filtered twist rate estimate for an optical fiber that has been twisted.

With reference to FIG. 5, the advantageous effect of using a filtered version of the first-order twist rate to compute the correction term to the twist rate will be illustrated. FIG. 5 shows the unfiltered first-order term $\tau_0$ of the twist rate and the filtered first-order term $\tau_f$ of the twist rate for an optical fiber that has been twisted over one full turn over a length of 1.78 m. The horizontal axis or scale is in indices, with one index corresponding to 0.04823 mm. The vertical axis or scale is in radians/index. The optical fiber was clamped before index 25000 and was also clamped after index 62000, and one full term of twist was applied to the clamping region at the end of the optical fiber. As can be seen the filtered first-order term $\tau_f$ is much smoother than the unfiltered first order term $\tau_0$ of the twist rate.

Figure 6:
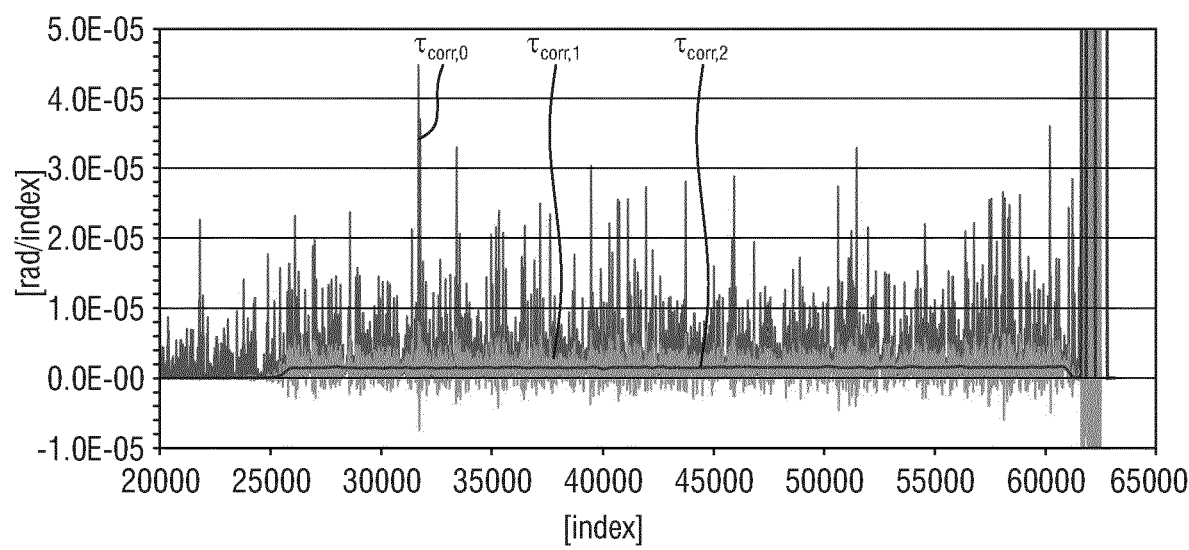
FIG. 6 shows three graphs of calculated second-order correction terms calculated from the unfiltered and filtered twist rate estimates.

Based on the unfiltered first-order term $\tau_0$ and, in the alternative, on the filtered first-order term $\tau_f$, correction terms to the twist rate have been calculated which are shown in FIG. 6. In FIG. 6, the graph $\tau_{corr,0}$ denotes a correction term calculated as $\tau_0^2/2k$, the graph $\tau_{corr,1}$ denotes a correction term to the twist rate calculated as $F \cdot \tau_0 \cdot \tau_f/2k$, and the graph $\tau_{corr,2}$ denotes a correction term calculated as $F \cdot \tau_f^2/2k$. In $\tau_{corr,1}$ and $\tau_{corr,2}$, the numerical factor F equals to 1.38. The spin rate k of the optical fiber has been equal to 0.014926 rad/index, corresponding to 49.2 turns/m.

Figure 7:
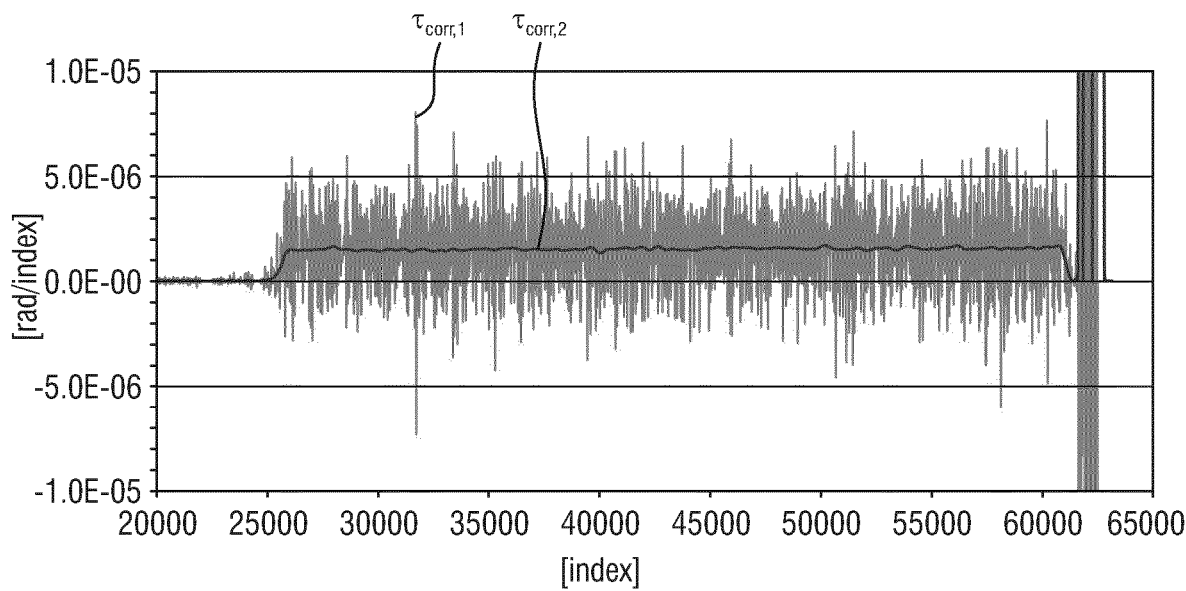
FIG. 7 shows two graphs of the correction terms in FIG. 6, wherein the graphs are zoomed in with respect to the y-axis.

FIG. 7 shows the correction terms $\tau_{corr,1}$ and $\tau_{corr,2}$ of FIG. 6 in an expanded vertical scale or y-axis.

Figure 8:
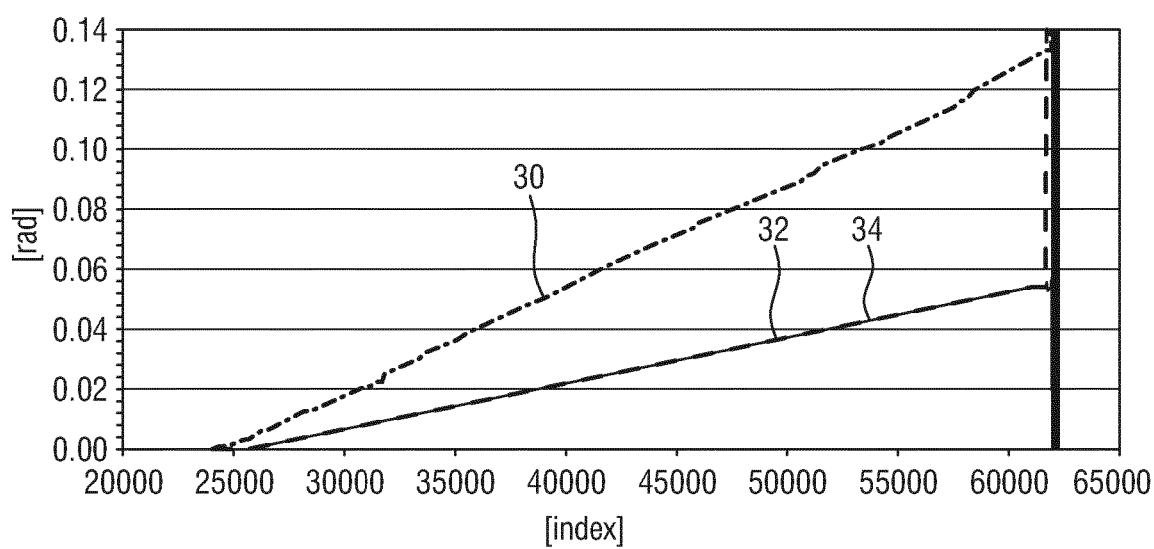
FIG. 8 shows graphs of a twist angle obtained from the twist rate by integration for the three correction terms in FIG. 6.

FIG. 8 shows the effect that the correction terms $\tau_{corr,0}$, $\tau_{corr,1}$, and $\tau_{corr,2}$ have on the twist angle. The twist angle is obtained from the twist rate by integration. In order to better show the differences between the effects of the correction terms $\tau_{corr,0}$, $\tau_{corr,2}$, and $\tau_{corr,2}$, only the integrated correction terms are shown in FIG. 8. The integrated first-order term of the twist rate is not shown. It can be seen in FIG. 8 that the correction terms $\tau_{corr,1}$ and $\tau_{corr,2}$ (graphs 32 and 34) give results that are essentially identical over the range of interest between the clamping regions, while the correction term $\tau_{corr,0}$ that does not use a filtered version of the twist rate phase signal to compute the correction gives an erroneous result (graph 30).

Next, the effect of the numerical factor F having a value different from unity on the correction term to the twist rate will be illustrated with reference to FIGS. 9 and 10A to 10F.

Figure 9:
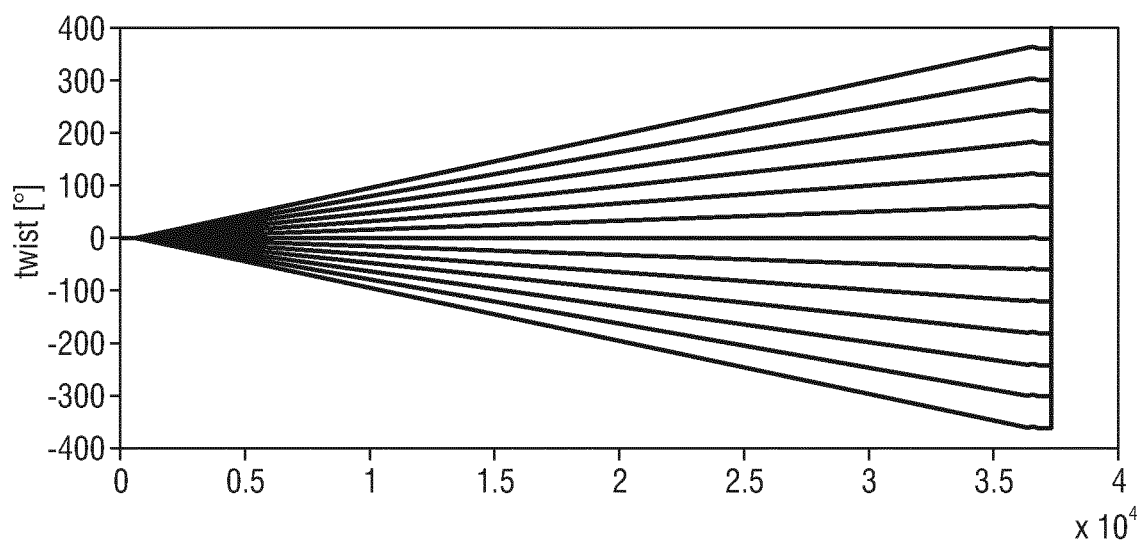
FIG. 9 shows graphs of twist angles of an optical fiber for several values of rotation angle (twist) applied to the optical fiber.

FIG. 9 shows the twist angle for an optical fiber clamped at the start (point 0 on the x-axis), while the other end of the optical fiber was clamped in a rotation stage. The x-axis of FIG. 9 is in indices. The rotation stage was turned in 60 degree increments over a range from −360 degrees to 360 degrees. From the twist rate phase signal supplied by the shape sensing system like the shape sensing system 10 in FIG. 1, the twist angle was computed by integration of the twist rate, including the second-order correction term that was computed according to $\tau_{corr,1}$ above. The analyses were performed for several values of the numerical factor F of the correction term. The length of the optical fiber between the clamping regions is approximately 1.78 m. FIG. 9 shows an example of obtained twist angle graphs, wherein each curve corresponds to one 60 degree increment.

For each of the twist angle graphs, a total twist angle was obtained as the difference of the average values of the twist angle over the two clamping regions. The total twist angles thus computed were compared with the applied rotation angles, which themselves are accurate to about 0.1 degree.

The difference between computed twist angles and applied rotation angles is plotted in FIGS. 10A to 10E. against the applied twist angles.

To make a visual assessment of the deviation from linearity easier, their average value was subtracted from differences and a straight-line fit to the residuals, shown as a horizontal line 36 in the plots, was also plotted.

Figure 10A:
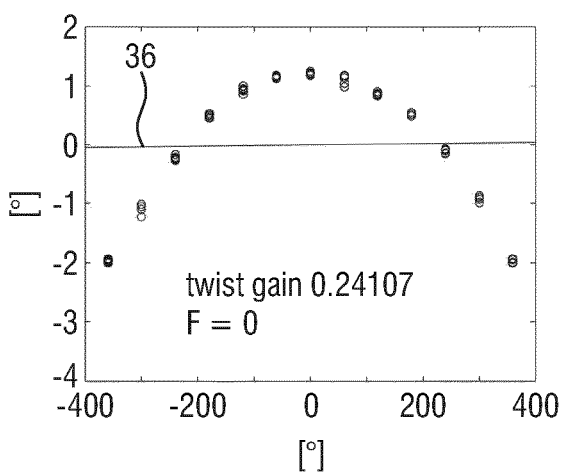
FIGS. 10A to 10F show various graphs of the difference between the calculated twist angle and the actual twist angle applied to an optical fiber.

FIG. 10A shows that when no second-order correction supplied, the deviation between computed twist and applied rotation changes by more than 3 degrees over the range of applied twist.

The allowed deviation depends on the desired accuracy of the reconstructed fiber shape, as well as on the twist range that needs to be accommodated. As an example, consider a fiber of 1.8 m length, with a right-angled bend in the middle, and a worst-case applied twist of one turn over the full length. When an end-point accuracy of 3 mm is desired, the computed twist at the location of the bend needs to be accurate to about 0.003/0.9=0.0033 radian, or 0.2 degree. Clearly, this accuracy is unattainable for the worst-case applied twist if no second-order correction is applied.

Figure 10B:
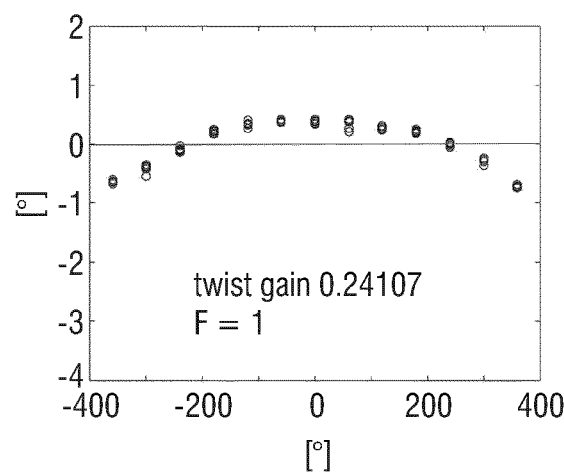

FIG. 10B shows the deviation between computed twist and applied twist when the second-order correction with F=1 is applied. The deviation between computed and applied twist decreases considerably (approximately threefold) when the correction is applied, but the desired accuracy is still not reached.

Figure 10C:
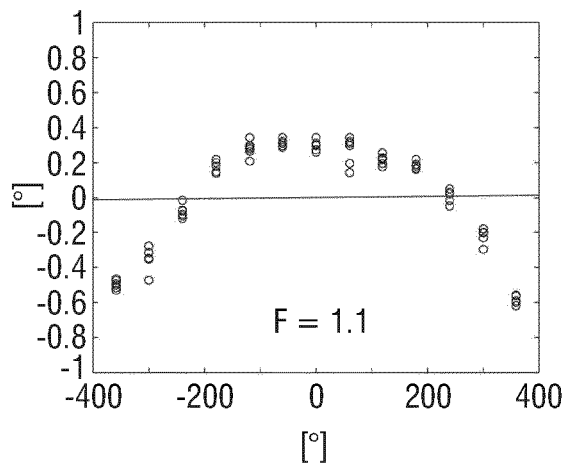
Figure 10D:
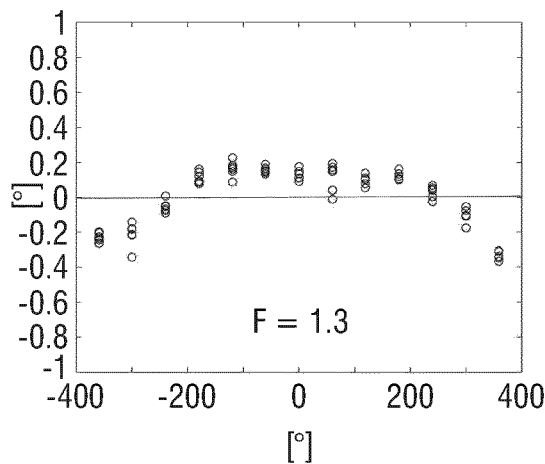
Figure 10E:
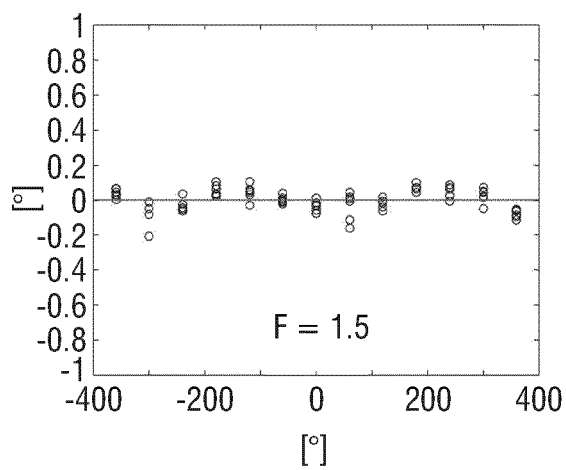
Figure 10F:
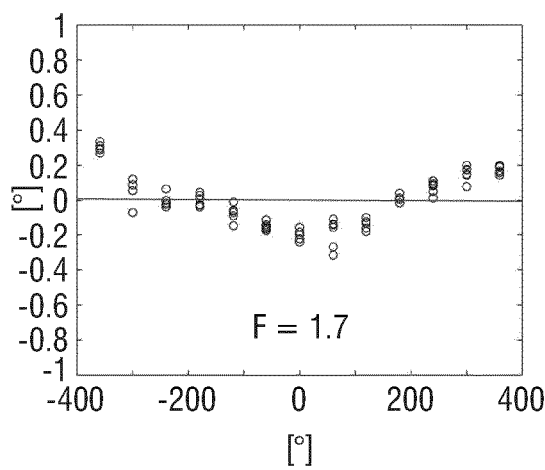

A better accuracy is reached when the numerical factor F is increased to values larger than 1. FIG. 10C shows the difference between computed twist and applied twist when a second-order correction is applied with the numerical factor F=1.1; FIG. 10D shows the deviation when the correction term with F=1.3 is applied; FIG. 10E shows a deviation when the correction term with F=1.5 is applied; and FIG. 10F shows the deviation when the correction term with F=1.7 is applied. FIG. 10C to 10F show how the accuracy of the computed twist angles improves values of the pre-factor F>1 are used. Note that the vertical scale of FIGS. 10C to 10F differs from the vertical scale in FIGS. 10A and 10B by a factor of 3.

Tests like the tests described before with reference to FIG. 9 and FIGS. 10A to 10F can be used as an indication whether or not a second-order correction term, in particular a second-order correction term according to the disclosure herein, has been used in the calculation of the twist rate from the twist rate phase signal in a shape sensing system. Further, if an optical fiber is placed in, e.g. shapes with right-angle bends with sufficient amount of added twist, the observed end-point errors will indicate if and how much second-order correction has been used. For a quantitative comparison, the spin rate of the optical fiber has to be known. The spin rate can be determined from visual inspection of a dissected fiber when visible light is injected into one of the outer cores. Whether a filtered twist rate phase signal has been used in the correction of the twist rate, can be evaluated from the signals provided by the optical shape sensing system.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. Method of obtaining a twist rate of a twist applied to an optical fiber about a longitudinal axis of the optical fiber at least in a part along a length of the optical fiber, the optical fiber having a center core extending along the length of the optical fiber and at least one outer core helically wound around the center core with a spin rate, the method comprising:
   acquiring a twist rate phase signal from an optical measurement of strain along the center core and the at least one outer core of the optical fiber,
   calculating from the twist rate phase signal a noise filtered version of the twist rate phase signal,
   calculating from the twist rate phase signal a first order term of the twist rate, which is proportional to one of:
   i) the twist rate phase signal, ii) the noise filtered version of the twist rate phase signal, and
   calculating a correction term to the twist rate, which is proportional to one of the following:
   iii) a product of the twist rate phase signal with the noise filtered version of the twist rate phase signal,
   iv) a square of the noise filtered version of the twist rate phase signal.

2. Method of claim 1, wherein calculating the correction term further comprises multiplying the product according to iii) or the square according to iv) with a numerical factor which is larger than 1 and smaller than 3.

3. Method of claim 2, wherein the numerical factor is larger than 1.1 and smaller than 2.5.

4. Method of claim 2, wherein the numerical factor is in a range from about 1.3 to about 1.7.

5. Method of claim 1, wherein the correction term is inversely proportional to the spin rate of the at least one outer core.

6. Method of claim 1, wherein the first order term of the twist rate is calculated as one of $$\tau_0 = TG \cdot S_\tau \quad \text{i)}$$

$$\tau_f = TG \cdot \langle S_\tau \rangle \quad \text{ii)}$$

wherein TG is a twist gain calibration parameter, $S_\tau$ is the acquired twist rate phase signal, and $\langle S_\tau \rangle$ is the noise filtered version of the acquired twist rate phase signal.

7. Method of claim 1, wherein the correction term of the twist rate is calculated as one of:

$$F \cdot \tau_0 \cdot \tau_f / 2k \quad \text{i)}$$

$$F \cdot \tau_f^2 / 2k \quad \text{ii)}$$

wherein k is the spin rate of the at least one outer core, $\tau_0$ is the first order term of the twist rate calculated based on the twist rate phase signal, and $\tau_f$ is the first order term of the twist rate calculated based on the noise filtered version of the twist rate phase signal, and F is a numerical factor larger than 1.

8. Method of claim 7, wherein the twist rate is calculated as one of the following:

$$\tau = \tau_0 - (F \cdot \tau_0 \cdot \tau_f / 2k) \quad \text{i)}$$

$$\tau = \tau_0 - (F \cdot \tau_f^2 / 2k) \quad \text{ii)}$$

9. Method of claim 1, wherein the twist rate phase signal is acquired from a strain signal of the at least one outer core minus a strain signal of the center core.

10. Method of claim 1, further comprising integrating the twist rate along the length of the optical fiber from a starting position to a selected position to obtain a twist angle at the selected position relative to the starting position.

11. System for obtaining a twist rate of a twist applied to an optical fiber about a longitudinal axis of the optical fiber at least in a part along a length of the optical fiber, the optical fiber having a center core extending along the length of the optical fiber and at least one outer core helically wound around the center core with a spin rate, the system comprising:
   an optical measuring device configured to measure strain along the center core and the at least one outer core of the optical fiber to acquire a twist rate phase signal,
   a calculating unit configured to:
   calculate from the twist rate phase signal a noise filtered version of the twist rate phase signal,
   calculate a first order term of the twist rate, which is proportional to one of: i) the twist rate phase signal, ii) the noise filtered version of the twist rate phase signal, and
   calculate a correction term of the twist rate, which is proportional to one of the following:
   iii) a product of the twist rate phase signal with the noise filtered version of the twist rate phase signal,
   iv) a square of the noise filtered version of the twist rate phase signal.

12. System of claim 11, wherein the optical measuring device is an optical shape sensing device based on optical frequency domain reflectometry.

13. Optical shape sensing system, comprising a system according to claim 11 for obtaining a twist rate of a twist applied to an optical fiber about a longitudinal axis of the optical fiber at least in a part along a length of the optical fiber, the optical fiber having a center core extending along the length of the optical fiber and at least one outer core helically wound around the center core with a spin rate.

14. A non-transitory computer readable medium with instructions stored thereon to control a processor to perform the method as claimed in claim 1.

* * * * *